May 29, 1962 — E. C. NELSON — 3,036,395
RELEASING FISH POINT
Filed June 11, 1959 — 2 Sheets-Sheet 1
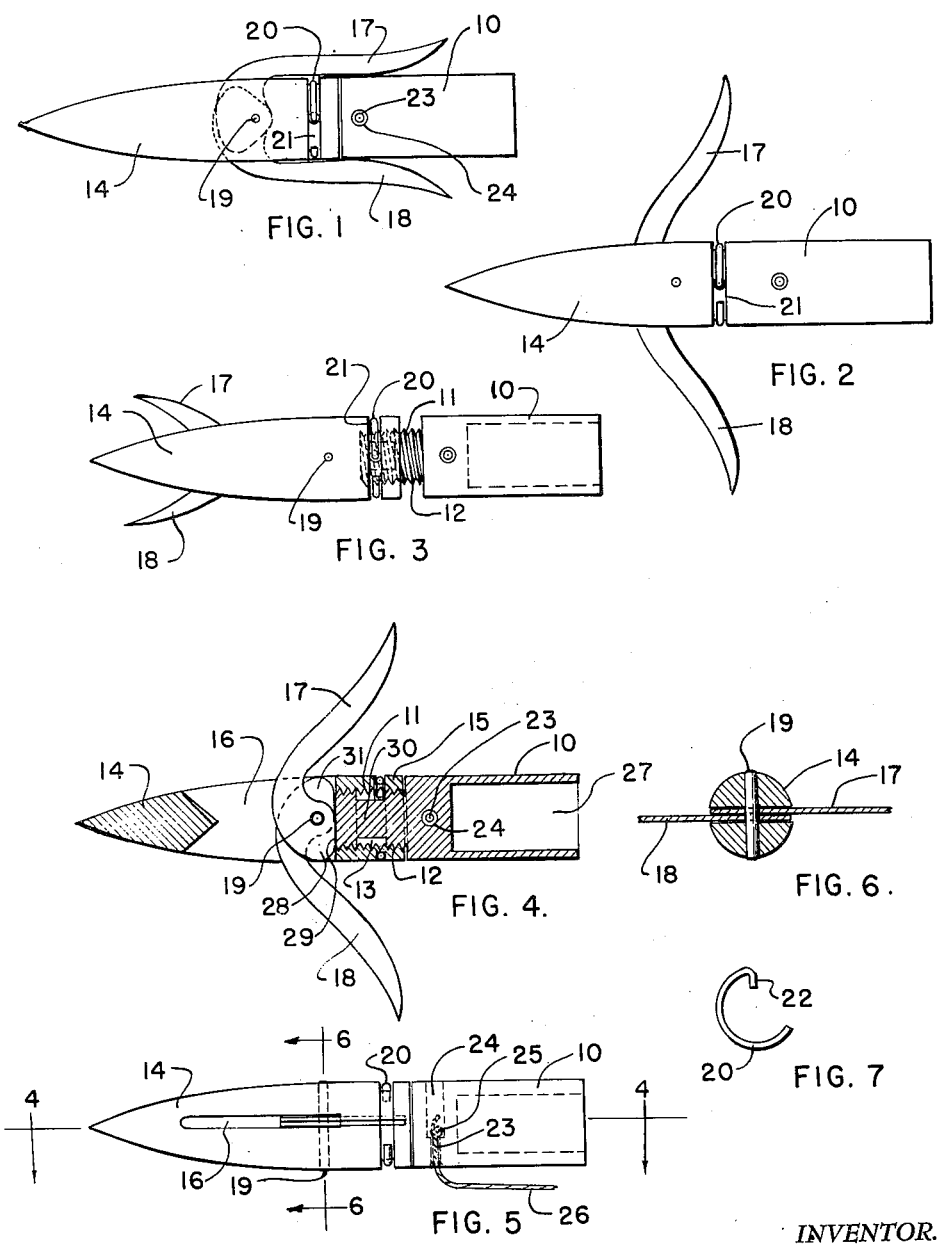
INVENTOR.
ERLO C. NELSON.
BY Victor J. Evans & Co.
ATTORNEYS May 29, 1962  E. C. NELSON  3,036,395
RELEASING FISH POINT
Filed June 11, 1959  2 Sheets-Sheet 2
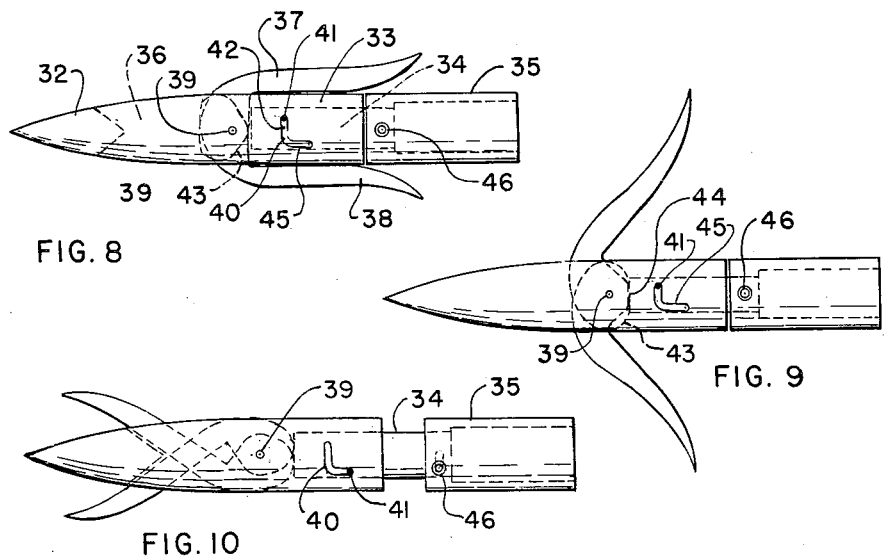
FIG. 8
FIG. 9
FIG. 10
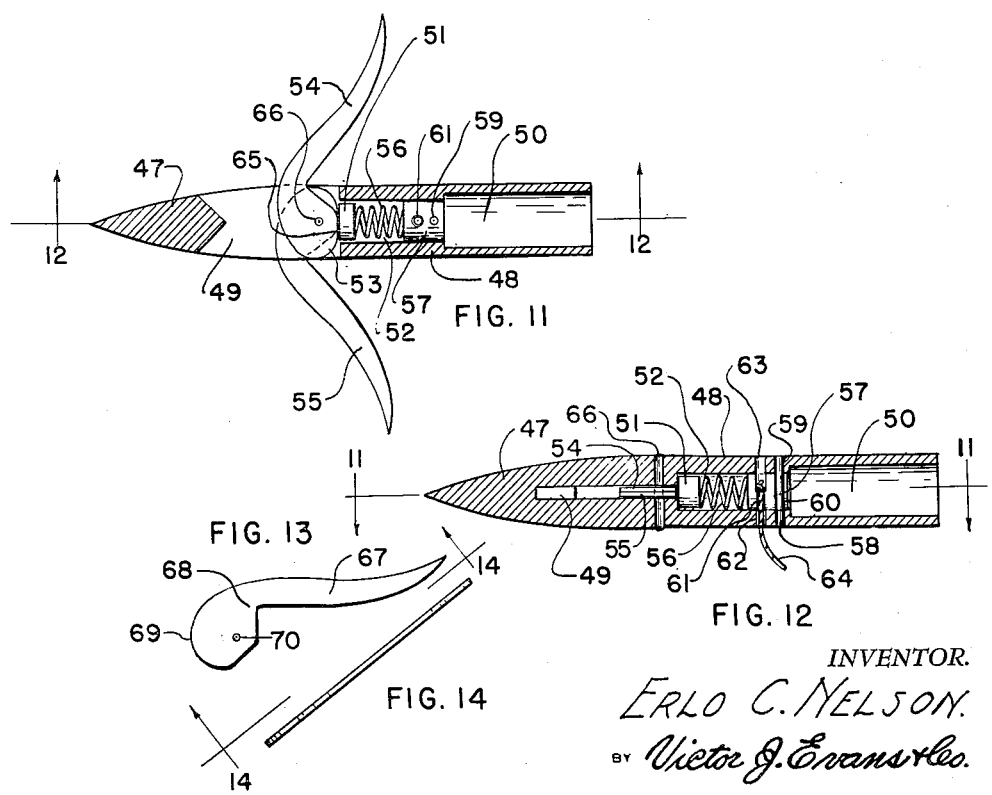
FIG. 11
FIG. 12
FIG. 13
FIG. 14
INVENTOR.
ERLO C. NELSON.
BY Victor J. Evans & Co.
ATTORNEYS

United States Patent Office 3,036,395
Patented May 29, 1962

3,036,395
RELEASING FISH POINT
Erlo C. Nelson, 204 Whitewater St., Milton, Wis.
Filed June 11, 1959, Ser. No. 819,671
3 Claims. (Cl. 43—6)

This invention relates to fishing tackle, particularly of the arrow or spear type, wherein a spear is projected by a gun with barbs therein folded to facilitate penetration of the point into a fish and wherein a pull on a line attached to the point releases the barbs whereby the barbs extend outwardly to secure the point in the fish until manually released.

The purpose of this invention is to provide means for mounting barbs in a point whereby the barbs are drawn outwardly to prevent the point being withdrawn from a fish, and wherein means is provided for manually releasing the barbs when the fish is in a boat or container.

Various types of spears, arrows and points have been provided with expanding barbs and whereas such barbs are readily actuated to grip a fish, it is sometimes difficult to remove a point having barbs extended therefrom from a fish without mutilating the fish. With this thought in mind, this invention contemplates a point having barbs pivotally mounted therein in which the barbs are controlled by a sleeve or spring so that the barbs will collapse or fold, or expand, as may be desired.

The object of the invention is, therefore, to provide an arrow or spear point having folding barbs in which the barbs are readily folded as the point penetrates a fish, expanded as force is applied to the point for withdrawing the point from a fish, and contracted to facilitate withdrawing the point from the fish.

Another object of the invention is to provide a point having folding barbs in which the barbs are controlled by cam surfaces or inner pivotally mounted ends thereof.

A further object of the invention is to provide a spear or arrow point having folding barbs therein in which the barbs are folded to permit the point to enter a fish, expanded to prevent the point being withdrawn from the fish, and contracted to facilitate withdrawing the point from the fish, in which the point is of a simple and economical construction.

With these and other objects and advantages in view the invention embodies an elongated body having slots extended transversely therethrough and having a pointed outer end, barbs pivotally mounted in the slots extended through the body, and means for securing the barbs in folded, extended, and retracted positions.

Other features and advantages of the invention will appear from the following description taken in connection with the drawings, wherein:

FIGURE 1 is a side elevational view of the improved arrow or spear point having barbs pivotally mounted therein and showing the barbs in folded positions.

FIGURE 2 is a view similar to that shown in FIGURE 1 showing the barbs extended.

FIGURE 3 is a view also similar to that shown in FIGURE 1 showing the point with the barbs retracted to facilitate withdrawing the point from a fish.

FIGURE 4 is a longitudinal section through the point with the parts in the positions illustrated in FIGURE 2 showing the cam formations on inner ends of the barbs and showing the barbs extended, the section being taken on line 4—4 of FIGURE 5.

FIGURE 5 is a plan view of the point also showing the barbs in the positions illustrated in FIGURES 2 and 4.

FIGURE 6 is a cross-section through the point taken on line 6—6 of FIGURE 5, showing the barbs extended.

FIGURE 7 is a view showing a locking spring clip for preventing accidental separation of the parts.

FIGURE 8 is a side elevational view, similar to that shown in FIGURE 1, showing the barbs held in folded positions by a bayonet slot.

FIGURE 9 is a view similar to that shown in FIGURE 8 showing the barbs extended.

FIGURE 10 is a side elevational view of the point with the barbs retracted.

FIGURE 11 is a longitudinal section through the point taken on line 11—11 of FIGURE 12, showing a further modification wherein the barbs are controlled by a spring.

FIGURE 12 is a longitudinal section taken on line 12—12 of FIGURE 11 illustrating the mounting of the barbs in the point.

FIGURE 13 is a side elevational view showing one of the barbs.

FIGURE 14 is an edge view of one of the barbs.

Referring now to the drawing wherein like reference characters denote corresponding parts the improved point of this invention includes a cylindrical body 10 having a stud with threaded sections 11 and 12 extended from one end and with a smooth section 13 between the threaded sections, a point 14 having an internally threaded socket 15 in a base portion and having a transversely disposed slot 16 extended therethrough positioned with the socket 15 threaded on the sections 11 and 12 of the stud, barbs 17 and 18 extended through the slot 16 and pivotally mounted therein by a pin 19, and a spring ring 20 positioned in an annular groove 21 in the outer surface of the socket 15 with an end 22 of the ring extended into the area in which the smooth section 13 of the stud is positioned.

The body portion 10 of the point is provided with a retrieving line receiving opening 23 having a counter-bore 24 for a knot 25 of a line 26 in one end, and a body portion or inner end, at the base of the point, is provided with an open socket 27 for reciving the end of a rod or staff of a spear or arrow.

The barb 17 is provided with a cam 28 that is positioned to engage the end surface 29 of the stud 30 on which the threaded surfaces 11 and 12 are positioned, and the barb 18 is provided with a similar cam surface 31 that is also positioned to engage the end surface 29 of the stud.

With the parts arranged as ilustrated in FIGURES 1 to 5 the point is threaded inwardly, on right hand threads, being turned in a clockwise direction to permit the barbs to be folded to the position shown in FIGURE 1 and in this position outward forces applied to ends of the barbs draw the barbs outwardly to the positions shown in FIGURES 2 and 4 whereby the point is prevented from being pulled out of a fish, and by rotating the point of the base portion in a counter-clock-wise direction, the pin 19 is moved away from the end surface 29 permitting the barbs to contract and assume the position illustrated in FIGURE 3 whereby the point may be withdrawn from a fish or the like.

In the design illustrated in FIGURES 8, 9 and 10, a point 32, similar to the point 14 is provided with a sleeve 33 by which the point is mounted on a stud 34 extended from a base 35 and the point is provided with a transversely disposed slot 36 in which barbs 37 and 38 are pivotally mounted by a pin 39. The sleeve 33 is provided with a bayonet slot 40 in which a pin 41 extended from the stud 34 is positioned, and with the pin in the vertical section 42 of the slot cam surfaces 43 of the barbs are in engagement with the end surface 44 of the stud whereby the barbs are retained in a folded position.

Upon rotating the stud 34 of the base 35 in a counter-clock-wise direction the pin 41 is turned to the longitudinally disposed section 45 of the bayonet slot 40 whereby the point is free to move outwardly of the stud 34 permitting the barbs to collapse or contract to the position illustrated in FIGURE 10 whereby the point may be withdrawn from a fish. The base 34 is provided with a transversely disposed opening 46 in which a fishing line may be secured.

In the design illustrated in FIGURES 11 and 12, the point 47 having an elongated body 48 is provided with a transversely disposed slot 49 and the opposite end is provided with a socket 50 by which the head or point may be secured on the end of a staff or rod of an arrow, spear, or the like, and the barbs are actuated by a sliding plug 51 in a bore 52 extended from the socket 50 and the plug 51 is urged against cam surfaces 53 of the barbs 54 and 55 by a spring 56, one end of which is held by a plug 57, that is secured in the bore 52 by a pin 58 which extends through an opening 59 in body 48 and an opening 60 in the plug 57. The plug 57 is also provided wtih an opening 61 one end of which is in registering relation with an opening 62 in one side of the body 48 and the opposite end of which is in registering relation with a counter-bore 63 in the opposite side. The end of a fishing line 64 is secured in the opening 61, as shown in FIGURE 12. The inner end portions 65 of the barbs 54 and 55 are pivotally mounted in the slot 49 by a pin 66.

The barbs 17 and 18, shown in FIGURE 1, 37 and 38, shown in FIGURE 8, and 54 and 55 shown in FIGURE 11, are provided with openings 70 by which the barbs are mounted by pins in the points, and the barbs are provided with arcuate points 67 that extend from base and cam portions 68. The base portions are formed with cam surfaces 69 in which the openings 70 are positioned.

The exact formation of the barbs and also of the cam surfaces thereof may be changed in accordance with different conditions under which the points are used.

The barbs may also be mounted and actuated by different means whereby the barbs may be folded to facilitate penetration of a fish, opened or extended to prevent accidental displacement of the point from the fish, and collapsed to facilitate withdrawing the point from a fish after the fish is in a boat, container, or the like.

It will be understood that modifications, within the scope of the appended claims, may be made in the design and arrangement of the parts without departing from the spirit of the invention.

What is claimed is:

1. A fishing head comprising a point and an elongated body, said body having staff attaching means at one end, and said point having a transversely disposed slot extended therethrough, barbs having pointed outer ends and cam surfaces on inner ends freely positioned in the slot of the point, a pin extended through the slot of the point pivotally mounted the barbs in the point, said point having a threaded socket at one end thereof, said threaded socket having an annular groove in the outer surface thereof, a stud having threads thereon, said threads having a smooth portion of smaller diameter than said threaded portion centrally thereof, said stud being extended from the opposite end of the body and removably engaged in said socket, said stud having end surface positioned to engage the cam surfaces of the barbs for retaining the barbs in folded and extended positions, and means mounted in the groove in the outer surface of said socket and engaging the smooth surface on said stud for limiting travel of the point in relation to said body, said body having a line attaching opening extended therethrough.

2. A fish holder comprising a point having a transversely disposed slot extended therethrough, barbs positioned in the point, a pin extended through the point and barbs pivotally mounting the barbs in the slot of the point, a base having a staff receiving socket extended inwardly from one end and having a threaded stud extended from the opposite end, the point having a sleeve threaded on the threaded stud of the base, said sleeve having an annular groove in the outer surface thereof, said threaded stud having a smooth portion of smaller diameter than said threaded portion centrally thereof, and a spring ring mounted in the annular groove of said sleeve and having one end thereof engaging the smooth portion of said threads for preventing accidental separation of the point from the base.

3. A fish holder comprising a point having a transversely disposed slot extended therethrough, and a socket extended inwardly from one end, the outer surface of the point surrounding the socket having a separation preventing means therein, a base having a staff receiving socket extended inwardly from one end and having a stud extended into the socket of the point, the stud having separating prevention means thereon cooperating with said first mentioned separating preventing means of the point, and barbs pivotally mounted in the slot of the point and having cam surfaces positioned to co-act with the end of the stud of the base for retaining the barbs in different positions.

References Cited in the file of this patent

UNITED STATES PATENTS

| 817,398 | Smith | Apr. 10, 1906 |
| 1,714,899 | Butts | May 28, 1929 |
| 2,289,284 | Chandler | July 7, 1942 |
| 2,859,970 | Doonan | Nov. 11, 1958 |
| 2,888,768 | Taylor | June 2, 1959 |

FOREIGN PATENTS

| 82,729 | Norway | Nov. 9, 1953 |